United States Patent
Tryon et al.

(10) Patent No.: US 7,232,402 B2
(45) Date of Patent: *Jun. 19, 2007

(54) MOTOR DRIVEN AUXILIARY PUMP FOR ELECTRICALLY-VARIABLE TRANSMISSION TORSIONAL DAMPER

(75) Inventors: Eric S. Tryon, Indianapolis, IN (US); William S. Reed, Greenfield, IN (US); William A. Stewart, Plainfield, IN (US); Christopher J. Bowes, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/061,138

(22) Filed: Feb. 18, 2005

(65) Prior Publication Data

US 2005/0205382 A1 Sep. 22, 2005

Related U.S. Application Data

(60) Provisional application No. 60/555,141, filed on Mar. 22, 2004.

(51) Int. Cl.
*B60W 30/20* (2006.01)
*F16D 3/14* (2006.01)
(52) U.S. Cl. .......................... 477/5; 475/5; 192/55.61; 192/70.17; 192/201; 192/212; 192/106 F
(58) Field of Classification Search ................ 192/201
See application file for complete search history.

(56) References Cited

U.S. PATENT DOCUMENTS

| 3,296,887 | A | * | 1/1967 | Larsen | ..................... 464/68.41 |
| 3,380,566 | A | * | 4/1968 | Cook | ......................... 192/213 |
| 3,863,746 | A | * | 2/1975 | Schulz | .................... 192/106 F |
| 4,624,351 | A | * | 11/1986 | Lutz et al. | ................. 192/48.5 |
| 5,009,301 | A | | 4/1991 | Spitler | ....................... 192/106.2 |
| 5,513,732 | A | * | 5/1996 | Goates | ......................... 192/3.3 |
| 5,558,589 | A | * | 9/1996 | Schmidt | ........................ 475/5 |
| 6,332,521 | B1 | * | 12/2001 | Shoji | ....................... 192/55.61 |
| 2005/0205379 | A1 | * | 9/2005 | Tryon et al. | ............. 192/70.17 |
| 2005/0205381 | A1 | * | 9/2005 | Tryon et al. | ............. 192/106 F |

FOREIGN PATENT DOCUMENTS

EP  1396368 A2 * 3/2004

* cited by examiner

*Primary Examiner*—Richard M. Lorence
(74) *Attorney, Agent, or Firm*—Christopher DeVries

(57) ABSTRACT

The present invention relates to a torsional damper for an electrically-variable transmission. The torsional damper is equipped with a hydraulically actuable lock-out clutch to directly couple the engine to the input shaft of the transmission. The electric motors provided with the electrically-variable transmission can serve to effectively cancel out engine compression pulses when the springs of the torsional damper are locked out. When the engine is off and the torsional damper assembly is in use, an auxiliary pump is provided to pump oil to the torsional damper assembly. The lock-out clutch is hydraulically balanced by the oil supplied by the auxiliary pump. The pump is strategically mounted to the transmission housing in a manner to minimize the distance between the auxiliary pump and the transmission without affecting any vehicle ground clearance requirements.

15 Claims, 2 Drawing Sheets

MOTOR DRIVEN AUXILIARY PUMP FOR ELECTRICALLY-VARIABLE TRANSMISSION TORSIONAL DAMPER

CROSS-REFERENCE TO RELATED APPLICATIONS

This application claims the benefit of U.S. Provisional Application 60/555,141 filed Mar. 22, 2004, which is hereby incorporated by reference in its entirety.

TECHNICAL FIELD

The present invention relates to an electrically-variable transmission with at least one electric motor (capable of canceling out engine vibrations) and a hydraulically actuable, selectively engageable torsional damper assembly, which is at least partially controlled by a motor driven auxiliary pump.

BACKGROUND OF THE INVENTION

Automobile engines produce torsionals or vibrations that are undesirable to transmit through the vehicle transmission. To isolate such torsionals, torsional dampers can be implemented into the vehicle transmission. These dampers rest between the engine crankshaft and the input shaft or turbine shaft of the transmission to substantially counteract the unwanted torsionals generated by the engine. Dampers are configured with springs that have the capacity to carry maximum engine torque plus some margin above.

One premise behind hybrid automobiles is that alternative power is available to propel the vehicle, thus reliance on the engine for power can be decreased, thereby increasing fuel economy. Since hybrid vehicles can derive their power from sources other than the engine, hybrid engines typically operate at lower speeds more often and can be turned off while the vehicle is propelled by the electric motors. For example, electrically-variable transmissions alternatively rely on electric motors housed in the transmission to power the vehicle's driveline. Engines in hybrid vehicles are therefore required to start and stop more often than engines in non-hybrid systems. Compression pulses are generated by the engine during starts and stops that can produce undesirable vibration in hybrid vehicles such as those having an electrically-variable transmission. Therefore, greater functionality is desirable in the damper assembly to aid the electrically-variable transmission in canceling these compression pulses.

Lastly, when the internal combustion engine is not operating, pumps which derive their power from the engine are also inoperable. Where hydraulic fluid is used to govern the torsional damper, the fluid is subjected to centrifugal loading as a result of the high annular speeds at which the torsional damper rotates.

SUMMARY OF THE INVENTION

Provided is an auxiliary pump which derives its power from an electric motor to hydraulically control a torsional damper assembly with a lock-out clutch. The lock-out clutch is piston actuated and the auxiliary pump supplies oil (or hydraulic fluid) to one side of the piston to apply the lockout clutch during predetermined conditions. The auxiliary pump also provides lube oil to other areas in the transmission, e.g., the damper vessel of the torsional damper assembly to hydraulically balance the piston when the torsional damper assembly is rotating at high speeds.

In one aspect of the present invention, an adaptor housing is provided with the auxiliary pump which enables the auxiliary pump to be mounted with respect to the transmission housing in a manner to minimize the distance between the auxiliary pump and the oil pan.

In another aspect of the present invention, the auxiliary pump is mounted to the transmission housing in a manner to not affect the ground clearance of the transmission and/or vehicle.

More specifically, the present invention provides a powertrain having an internal combustion engine, characterized as generating compression pulses during start and/or stop modes of operation and torsionals during other modes of operation, and an electrically-variable transmission. The electrically-variable transmission includes a transmission housing and a torsional damper assembly enclosed within the transmission housing. Further provided is a damper flange, in the torsional damper assembly, rotatable with the engine, having a damper spring enabling the torsional damper assembly to absorb such engine torsionals during the other modes of operation. Also included is a lock-out clutch selectively engageable with the damper flange for locking out the damper spring. The transmission has at least one electric motor operable to selectively cancel the engine compression pulses when the damper spring is locked out. An auxiliary pump powered by an electric motor and operable to pump hydraulic fluid to the torsional damper assembly when the engine is not operating is also provided.

Further provided is a method of supplying hydraulic fluid to an electrically-variable transmission with a torsional damper assembly for selectively canceling out engine generated compression pulses and torsionals. The method includes: providing a piston actuated lock-out clutch between the engine and the electrically-variable transmission; operating an electric motor in the electrically-variable transmission in a manner to cancel or reduce engine compression pulses when the torsional damper is locked out; and pumping hydraulic fluid to at least one side of the piston of the lock-out clutch to hydraulically counter balance any hydraulic fluid on the opposing side of the piston.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
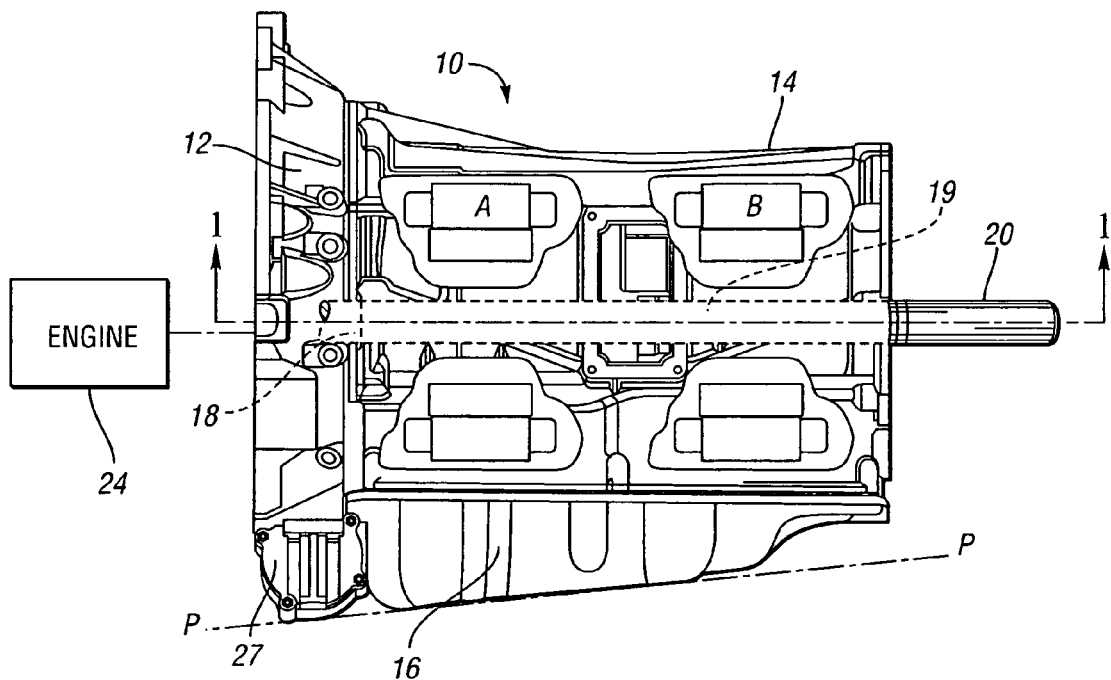
FIG. 1 is a schematic side view of an electrically-variable transmission (EVT) with parts broken away to show selected transmission components and an auxiliary pump mounted to the transmission.
Figure 2:
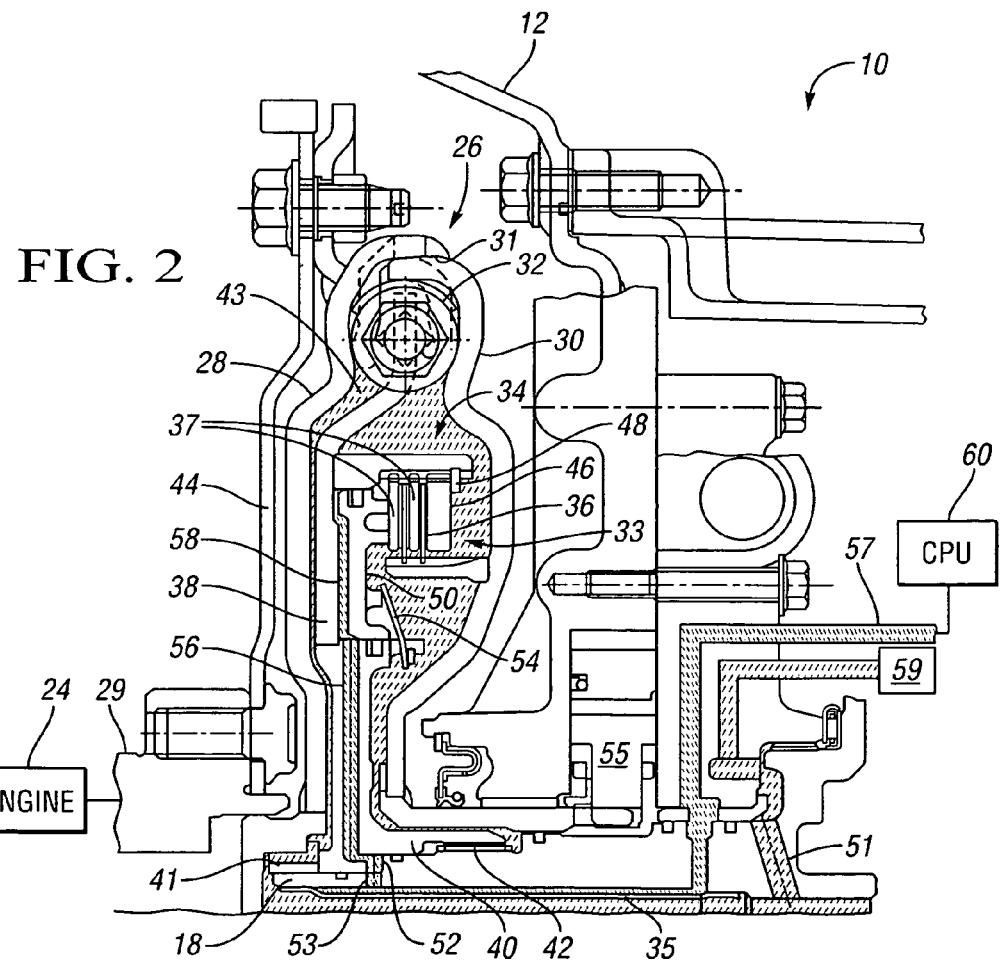
FIG. 2 is a fragmentary cross-sectional view of the EVT of FIG. 1 taken along one side of the centerline of the front portion of the electrically-variable transmission.
Figure 3:
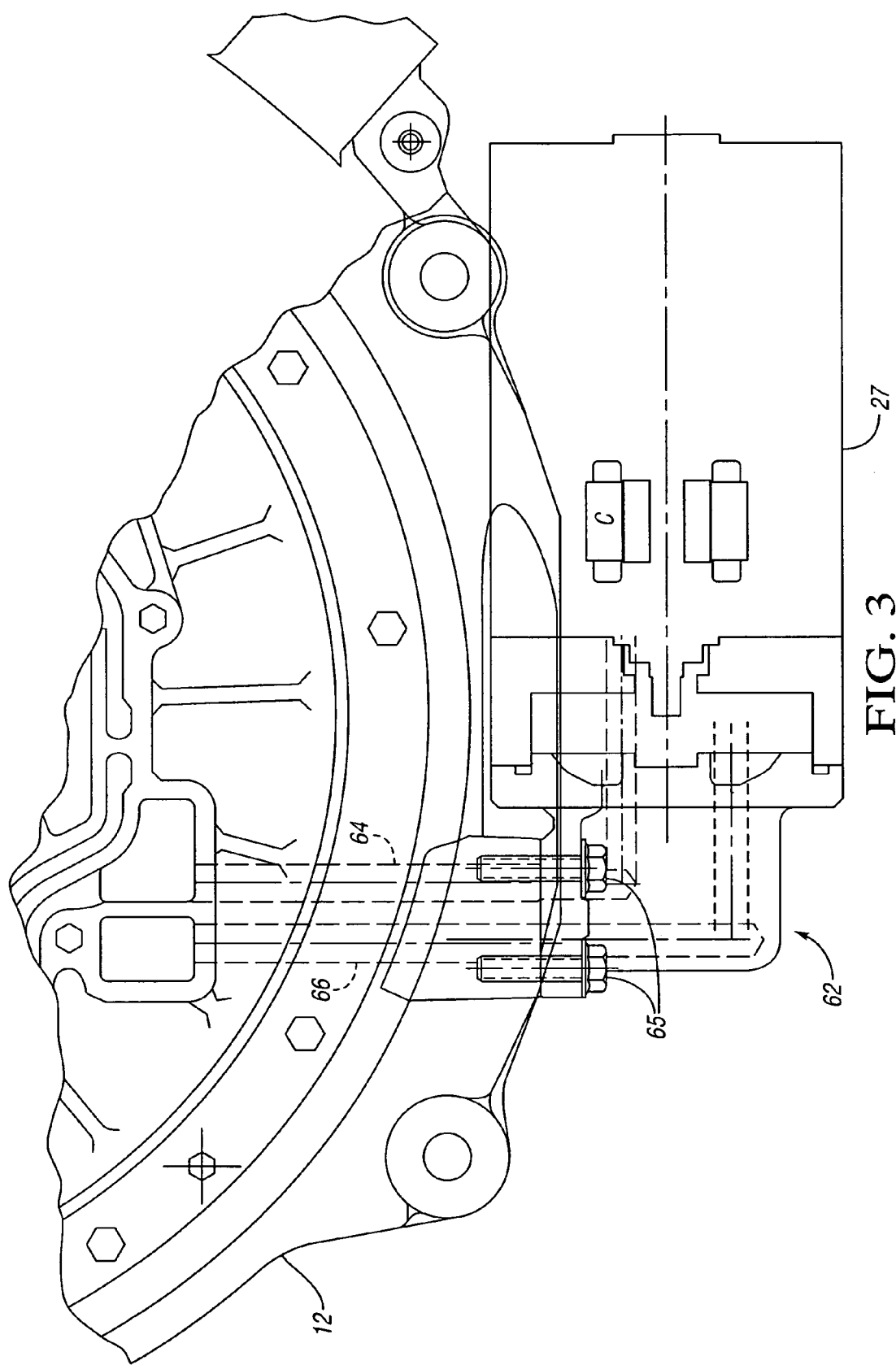
FIG. 3 is a schematic cross-sectional view of the auxiliary pump and adaptor housing mounted to the transmission, which is partially cut away.

Referring to the drawings, FIGS. 1 through 3, wherein like characters represent the same or corresponding parts throughout the several views, there is shown in FIG. 1 a side view of an electrically-variable transmission 10. The internal combustion engine 24 is characterized as generating compression pulses during start and/or stop modes of operation and torsionals during other modes of operation. The electrically-variable transmission 10 includes a transmission main housing 14 and a torsional damper assembly 26, as shown in FIG. 2, enclosed within the input housing 12. Further provided is a damper flange 38, in the torsional damper assembly 26 rotatable with the engine 24, having a damper spring 32 enabling the torsional damper assembly to absorb such engine torsionals during the other modes of operation. Also included is a lock-out clutch 33 selectively engageable with the damper flange 38 for locking out the damper spring 32. The transmission has at least one electric motor (A or B as shown in FIG. 1) operable to selectively cancel the engine compression pulses when the damper spring 32 is locked out. An auxiliary pump 27 (as shown in FIGS. 1 and 3) is powered by an electric motor and operates to pump hydraulic fluid to the torsional damper assembly 26, as shown in FIG. 2, when the engine is not operating.

More specifically, FIG. 1 displays selected components of an electrically-variable transmission 10 including the input housing 12 and main housing 14 with dual electric motors (A and B), which are indirectly journaled onto the main shaft 19 of the transmission 10 through a series of planetary gear sets (not shown). The motors (A, B) operate with selectively engaged clutches (not shown) to rotate the output shaft 20. The oil pan 16 is located on the base of the main housing 14 and is configured to provide oil volume for the transmission 10 and its components. The projection line P—P of the oil pal 16 defines the necessary ground clearance for the vehicle, as shown in FIG. 1. The main housing 14 covers the inner most components of the transmission such as the electric motors (A, B), planetary gear arrangements, the main shaft 19 and two clutches (all of which are mentioned for exemplary purposes and not all are shown). Finally, the input housing 12 is bolted directly to the engine block rear face of the engine 24 (schematically represented in FIG. 2) and encases the transmission components that mechanically interface with the engine 24. Namely, the input housing 12 covers the torsional damper assembly 26 (shown in FIG. 2). The input housing 12 also supports an auxiliary pump 27 (as shown in FIGS. 1 and 3), which is mounted to the base of the input housing 12 and secured nestably adjacent the oil pan 16 and above the projection line P—P.

The torsional damper assembly 26, as shown in FIG. 2, generally functions to isolate the transmission 10 from unwanted torsionals generated by the engine 24 during operation and also to selectively aide the transmission electric motors (either A or B) in canceling engine compression pulses during starts and stops. The torsional damper assembly 26 consists of an engine side cover 28, which is affixed to the engine crankshaft 29. The engine side cover 28 is welded to the transmission side cover 30 at 31 and houses the damper springs 32. The two covers (28 and 30) define a vessel 34, which encloses the lock-out clutch 33 and a piston 50. The torsional damper assembly 26 further houses a damper flange 38 with hub portion 40 that mates to the input shaft 18 at complementary splines 42. The engine side cover 28 of the torsional damper assembly 26 is affixed to an engine flexplate 44. The flexplate 44 functions to transmit to the transmission the torque produced by the engine 24 and also to absorb any thrust loads generated by the torsional damper assembly 26. The torsional damper assembly 26 consists of a series of damper springs 32 running annularly or circumferentially between the engine side cover 28 and transmission side cover 30. The damper springs 32 absorb and dampen the unwanted torsionals produced by the engine 24 during normal or drive mode operation. The torsional damper assembly 26 has a torque capacity equal to the maximum torque capacity of the engine plus some margin. The torsional damper assembly 26 may be configured, in part, similarly to the structure disclosed in commonly owned, U.S. Pat. No. 5,009,301, which is hereby incorporated by reference in its entirety.

The electrically-variable transmission 10 is equipped with two electric motors (A and B as shown in FIG. 1). Electric motor A creates a torque during start and stop that effectively cancels out the engine compression pulses caused when the engine is operating at speeds below 600 rpm (or in start and/or stop mode). The damper springs 32 of the torsional damper assembly 26 can be locked out by applying the clutch plates 36 and 37 (of the lock-out clutch 33) when the engine 24 is operating within a predetermined speed range. In the preferred embodiment, the torsional damper assembly 26 is effectively locked out when the engine is operating at speeds less than or equal to 600 rpm. This mode of operation is desirable because in an electrically-variable transmission either electric motor (A or B) can be used to actively cancel out engine compression pulses generated during start or stop.

The lock-out clutch 33, located inside the torsional damper assembly 26, consists of two reaction plates 37 connected to the damper flange 38, two friction plates 36 connected to the transmission side cover 30, a backing plate 46 and a snap ring 48 that is attached to the damper flange 38. The lock-out clutch 33 includes a hydraulic piston 50 which moves against the reaction plates 37 forcing them to engage the friction plates 36. The piston 50 moves in response to oil fed into cavity 58 from an oil circuit 57. The load is reacted at the backing plate 46 and snap ring 48 and contained by the damper flange 38. Adjacent the piston 50 and affixed to the damper flange 38 is the damper hub 40 of the torsional damper assembly 26, which has a cross-drilled channel 56, to define a radially extending aperture 52 that receives oil from circuit 57. The piston 50 is restricted from engaging with the lock-out clutch 33 and held in the disengaged position by a return spring 54. As oil is fed between the inner diameter of the input shaft 18 and the outer diameter of a steel tub 35, through aperture 53 in the input shaft 18 to aperture 52 in the damper hub 40, and into channel 56 in the damper hub 40, the pressure inside the piston cavity 58 increases, creating a load sufficient to overcome the spring force and stroke the piston 50, thereby engaging the lock-out clutch 33. The vessel 34 is also filled with oil from the hydraulic circuit 59 (pumped by either the auxiliary pump 27 as shown in FIGS. 1 and 3 or the main transmission pump 55 as shown in FIG. 1). The oil passes from aperture 52 through the interior of tube 35 fitted in the inner diameter of the input shaft 18 and leads through a grooved washer 41 or bushing and into the cavity or spacing 43 in the interior of vessel 34. The oil thus received in vessel 34 travels to the right side of the piston 50, as shown in FIG. 2, to counter balance the oil fed into cavity 58 on the other side of the piston 50 during predetermined modes of operation when it is desired that the clutch not be applied (i.e., engine speeds above 600 rpm).

The hydraulic circuits 57 and 59, as schematically shown in FIG. 2, supply oil to the piston cavity 58 and damper vessel 34 respectively; governing the lock-out clutch 33 and commanding it to engage and disengage under certain predetermined conditions. The first circuit 57 ultimately delivers hydraulic fluid supplied by the auxiliary pump 27 to the piston cavity 58. The piston 50 inside the torsional damper assembly 26 responds to the increased pressure resulting from the oil fed through the first circuit 57 by stroking and engaging the lock-out clutch 33 to effectively lock out the damper springs 32. When the lock-out clutch 33 is engaged the torsional damper springs 32 are deactivated or locked out so that the engine 24 is directly coupled to the input shaft 18 of the transmission 10. This condition is only preferred for engine starts and stops (i.e., the start and/or stop modes wherein engine speeds are within the predetermined speed range: between 0 and 600 rpm).

The second circuit 59, which can obtain oil from either the main pump 55 or the auxiliary pump 27, uses the auxiliary pump 27, as shown in FIGS. 1 and 3, when the main pump 55 is not operating. The second circuit 59 supplies oil to the right side of the piston 50 (or the damper vessel 34) as viewed in FIG. 2 to hydraulically balance the piston 50. Oil travels through aperture 51 to the inner diameter of the steel tube 35, through a grooved thrust washer 41 (or bushing) into spacing 43 and into the damper vessel 34.

When the engine is off, the main pump 55, as shown in FIG. 2, which derives its power from the engine, is inoperable. Since the damper vessel 34 is unsealed, the oil inside drains from the damper vessel 34 until approximately half full when the main pump 55 and auxiliary pump 27 are not in operation. The remaining oil is forced to the perimeter of the torsional damper assembly 26 by the centrifugal loading resulting from the revolution of the input shaft 18 and torsional damper assembly 26. Likewise, the oil remaining in the damper flange 38 is forced into the piston cavity 58 (i.e., its perimeter). Since the oil in the damper flange 38 is concentrated in the piston cavity 58 the oil in the piston cavity 58 weighs on the piston 50. At high speeds the centrifugal loading on the oil in the piston cavity 58 may overcome the force of the return spring 54 and stroke the piston 50. In the preferred embodiment, the pressure difference between the piston cavity 58 and the damper vessel 34 must be greater than or equal to 4 psi to overcome the return spring and 60 psi to get full torque holding capacity on the clutch 33. This engagement of the lock-out clutch 33 and effectively locking out of the torsional damper assembly spring 32 can lead to additional wear on transmission components causing premature failure or reduced cycle life if it occurs outside of the predetermined speed range.

One of the technical advantages of the present invention is that the auxiliary pump 27, as shown in FIGS. 1 and 3, is configured to supply oil (or hydraulic fluid) to the torsional damper assembly 26 when the engine 24 is off, thereby providing transmission clutch pressure, damper clutch pressure and lubrication. Additionally, the auxiliary pump 27 and main pump 55 supply oil to the remaining portion of the damper vessel 34. In a preferred embodiment, the auxiliary pump 27 is a gerotor pump driven by an electric motor C, as schematically shown in FIG. 3. As shown in FIG. 1, the auxiliary pump 27 lies nestably adjacent the oil pan 16 and above the projection line P—P of the oil pan (or an imaginary line extrapolated from the bottom of the oil pan 16) so that the pump 27 does not require additional ground clearance.

The auxiliary pump 27 is secured to the bottom of the input housing 12 by an adaptor housing 62 which has a suction line 66 and pressure line 64, as shown in FIG. 3. The adaptor housing 62 is secured to the input housing 12 through structural connectors (or bolts 65) and separates the auxiliary suction line 66 and auxiliary pressure line 64 which each extend between the auxiliary pump 27 and input housing 12. The auxiliary pump 27 is mounted to the input housing 12 to be as close as possible to the oil sump and control module which are located in the oil pan 16, as shown in FIG. 1, to minimize line losses on both the suction and pressure lines (66 and 64, respectively as shown in FIG. 3) of the pump 27. Oil is filtered and pulled through the auxiliary suction line 66 from the oil sump (or source of oil within the oil pan 16) to the auxiliary pump 27. Pressurized oil is then pushed through the adaptor housing pressure line 64, into the transmission controller 60 (as schematically shown in FIG. 2) and ultimately fed back into the input shaft 18 via the first hydraulic circuit 57.

While the best modes for carrying out the invention have been described in detail, those familiar with the art to which this invention relates will recognize various alternative designs and embodiments for practicing the invention within the scope of the appended claims.

The invention claimed is:

1. A powertrain having an internal combustion engine characterized as generating compression pulses during start and/or stop modes of operation and torsionals during other modes of operation and an electrically variable transmission, comprising:
   a transmission housing;
   a torsional damper assembly enclosed within said transmission housing;
   a damper flange, in said torsional damper assembly, rotatable with said engine, having a damper spring enabling the torsional damper assembly to absorb such engine torsionals during the other modes of operation;
   a lock-out clutch selectively engageable with said damper flange for locking out said damper spring;
   at least one electric motor in the electrically variable transmission operable to selectively cancel the engine compression pulses when the damper spring is locked out; and
   an auxiliary pump powered by an electric motor and operable to pump hydraulic fluid to said torsional damper assembly and the transmission when the engine is not operating.

2. The powertrain of claim 1, further comprising:
   a piston secured to said damper flange and operable to actuate said lock-out clutch for locking out said damper spring; and
   wherein said auxiliary pump is configurable to pump hydraulic fluid to at least one side of said piston to hydraulically balance said piston.

3. The powertrain of claim 1, further comprising:
   an input housing at least partially defining said transmission housing and at least partially enclosing said torsional damper assembly;
   an oil pan mounted with respect to said transmission housing; and
   an adaptor housing enabling said auxiliary pump to be secured with respect to said input housing of the electrically variable transmission in a manner to minimize the pumping distance between said auxiliary pump and said oil pan.

4. The powertrain of claim 3, wherein said adaptor housing includes a suction line operable to retrieve oil from the electrically variable transmission; and
   wherein said adaptor housing includes a pressure line enabling said auxiliary pump to pump hydraulic fluid to said torsional damper assembly.

5. The powertrain of claim 1, wherein said auxiliary pump is mounted with respect to the electrically variable transmission sufficiently in a manner to not affect the ground clearance of the vehicle.

6. The powertrain of claim 5, further comprising:
an oil pan mounted with respect to said transmission housing; and
wherein said auxiliary pump is mounted with respect to said input housing within an imaginary line extrapolated from the bottom of said oil pan.

7. An electrically variable transmission, comprising:
a transmission housing;
a torsional damper assembly enclosed within said transmission housing;
a damper flange, in said torsional damper assembly, having a damper spring enabling the torsional damper assembly to absorb torsionals and compression pulses;
a lock-out clutch selectively engageable with said damper flange for locking out said damper spring;
at least one electric motor in the electrically variable transmission operable to selectively cancel the engine compression pulses when the damper spring is locked out; and
an auxiliary pump powered by an electric motor and operable to pump hydraulic fluid to said torsional damper assembly.

8. The electrically variable transmission of claim 7, further comprising:
a piston secured to said damper flange and operable to actuate said lock-out clutch for locking out said damper spring; and
wherein said auxiliary pump is configured to pump hydraulic fluid to at least one side of said piston to hydraulically balance said piston.

9. The electrically variable transmission of claim 7, further comprising:
an input housing at least partially defining said transmission housing and at least partially enclosing said torsional damper assembly;
an oil pan mounted with respect to said transmission housing; and
an adaptor housing enabling said auxiliary pump to be secured with respect to said input housing of the electrically variable transmission in a manner to minimize the pumping distance between said auxiliary pump and said transmission.

10. The electrically variable transmission of claim 9, wherein said adaptor housing includes a suction line operable to retrieve oil from the electrically variable transmission; and
wherein said adaptor housing includes a pressure line enabling said auxiliary pump to pump hydraulic fluid to said torsional damper assembly.

11. The electrically variable transmission of claim 7, wherein said auxiliary pump is mounted sufficiently compactly with respect to the electrically variable transmission in a manner to not effect the ground clearance of the vehicle.

12. The electrically variable transmission of claim 11, further comprising:
an oil pan mounted with respect to said transmission housing; and
wherein said auxiliary pump is mounted with respect to said input housing within an imaginary line extrapolated from the bottom of said oil pan.

13. A method of supplying hydraulic fluid to an electrically variable transmission with a torsional damper assembly for selectively canceling out engine generated compression pulses and torsionals, comprising:
providing a piston actuated lock-out clutch between the engine and the electrically variable transmission;
operating an auxiliary pump to provide hydraulic fluid to one side of the piston to actuate said lock-out clutch;
operating an electric motor in the electrically variable transmission in a manner to cancel or reduce engine compression pulses when the torsional damper is locked out; and
pumping hydraulic fluid to another side of the piston to hydraulically counter balance hydraulic fluid on said one side of the piston.

14. The method of claim 13, further comprising:
providing an input housing at least partially defining said transmission housing and at least partially enclosing said torsional damper assembly;
providing an oil pan mounted with respect to said transmission housing; and
commonly mounting an adaptor housing to said auxiliary pump and said input housing thereby securing said auxiliary pump to said input housing of the electrically variable transmission in a manner to minimize the pumping distance between said auxiliary pump and said oil pan.

15. The method of claim 14, wherein said auxiliary pump is mounted with respect to the electrically variable transmission sufficiently to not effect the ground clearance of the electrically variable transmission.

* * * * *